May 17, 1949.  F. W. AVILA  2,470,208
SYNCHRONIZER
Filed April 9, 1945  2 Sheets-Sheet 1

Inventor:
Frank W. Avila
By: Paul O. Pippel
Atty.

May 17, 1949. F. W. AVILA 2,470,208
SYNCHRONIZER
Filed April 9, 1945 2 Sheets-Sheet 2

Inventor:
Frank W. Avila
By: Paul O. Pippel
Atty.

Patented May 17, 1949

2,470,208

UNITED STATES PATENT OFFICE 2,470,208

SYNCHRONIZER

Frank W. Avila, Columbia City, Ind., assignor to International Harvester Company, a corporation of New Jersey Application April 9, 1945, Serial No. 587,409

14 Claims. (Cl. 192—53)

The present invention relates to synchronizing clutches for change-speed transmissions. The general purpose and object of the invention is to provide a synchronizing clutch mechanism wherein the synchronizing clutches are carried by a simplified mounting structure in such a manner as to be self-centering to provide for any misalignment due to eccentricities or cocking.

Another principal object of the invention is to provide a synchronizing clutch in which the synchronizing cones are supported against axial movement except for the distance required to engage and disengage by a shiftable member carried by one of the power transmitting members and in which said synchronizing cones are supported against movement in a radial direction by a supporting structure secured to the other of the two power transmitting members which are to be synchronized and connected by positive clutch means.

A subsidiary object is to provide a resilient spring supporting structure for synchronizing cones.

Another object is to provide a resilient support with axially formed slots to engage corresponding lugs on synchronizer cones to transmit torque and to permit axial movement of the synchronizing cones relative to the spring support.

Another object is to provide a fingered spring support for a slotted synchronizing cone with cam portions to engage lugs of a driving member for providing a blocking action.

The above objects, and others which will be apparent from the detailed description to follow, are attained by a construction such as shown in the accompanying drawings, in which, Figure 1 is a view in elevation of a portion of a change-speed transmission in which a synchronizer unit embodying the invention is shown;

Figure 1:
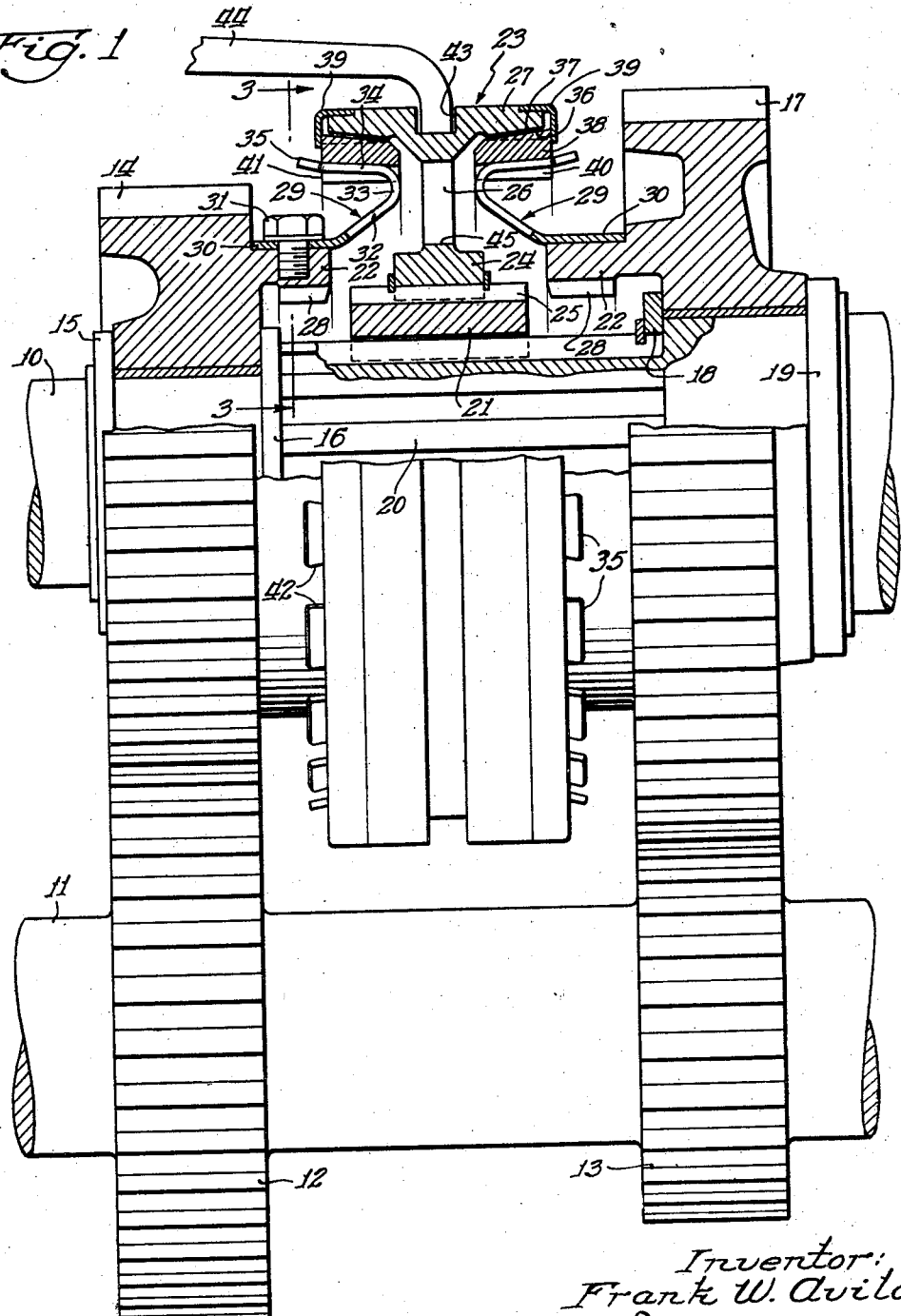

In the drawings, a driven shaft 10 is illustrated which may be in a conventional construction be the output shaft of the transmission. A portion of a shaft 11, having integral gears 12 and 13 thereon, may be the countershaft of such a transmission. The gear 12 is shown as meshing with a power input driving member in the form of a gear 14 rotatably mounted on a portion of the shaft 10 and held thereon against axial movement by thrust members 15 and 16. A second gear 17 is rotatably mounted on another portion of the shaft 10 spaced from the gear 14, being held thereon against axial movement by thrust members 18 and 19. The portion 20 of the shaft 10 between the gears 14 and 17 is splined. An internally splined sleeve 21 is slidably mounted on the said portion 20 for rotation therewith and for movement in an axial direction with respect thereto.

The gears 14 and 17 are each provided with an annular, inwardly-extending, sleevelike extension 22 overlying the splined portion 20 of the shaft 10. As these sleeves and the portions of the synchronizer unit at opposite sides of the central plane thereof are identical, the same reference characters will be used in designating the parts and only one side will be described.

A shifter member 23 is provided with a hub 24 which is internally splined and fitted on the outer surface of the member 21 which is also provided with splines 25. The shifter member 23 is further provided with a plurality of spaced narrow spokes 26 oining the hub 24 with an outer cylindrical annulus or barrel 27.

The splines 25 of the member 21 are adapted to register with and engage splines 28 formed internally on the extensions 22 of the gears. When the shifter member 23 is moved in one direction, the splines 25 may be engaged with the splines 28 of one gear, and when the shifter member is moved in the opposite direction the splines 28 of the other gear may be engaged.

A supporting spring, designated in its entirety by the reference character 29, is mounted on each of the extensions 22. Each spring is provided with a cylindrical portion 30 which is mounted on the corresponding extension 22, being rigidly secured thereon by suitable means such as cap screws 31. Each spring is further provided with a plurality of circumferentially spaced fingers 32. Said fingers extend axially inwardly and radially outwardly from the cylindrical portion 30 of the spring. The fingers are then bent with a smooth curved portion 33 outwardly lying substantially in a cylinder having the axis of the shaft 10 as its axis. These outwardly-extending portions 34 of the fingers are, however, bent slightly outwardly in a radial direction throughout their length and are provided with end portions 35 which have a substantially outwardly bent angle for a purpose to be hereinafter described.

The sleeve or barrel 27 is provided at each side with conical friction faces 36. Said faces are adapted to frictionally engage conical faces 37 having the same angle formed on synchronizer cones 38. The faces 37 may be serrated as illustrated or in any other manner to provide for obtaining a maximum friction coefficient without striking or scoring of the metal.

The synchronizer cones 38 are held against substantial endwise movement by angular retainers 39 fitted on the ends of the sleeve 27 and having down-turned angular end portions providing abutments for the outer ends of the cones 38.

As indicated in Figure 1, clearance is shown between the faces 37 of the synchronizer cones and the mating faces 36 on the barrel 27.

Figure 2:
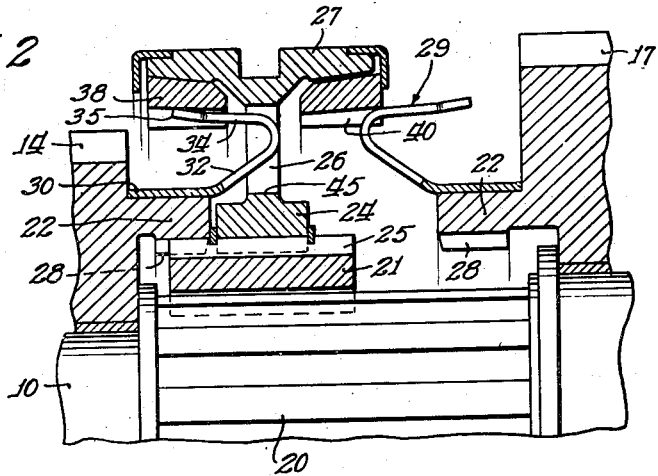
Figure 2 is a section similar to the sectional portion of Figure 1 showing the synchronizer with the positive clutch thereof in engagement.

In Figure 2 the left-hand cone is illustrated in its frictionally engaged position with said barrel 27.

Figure 3:
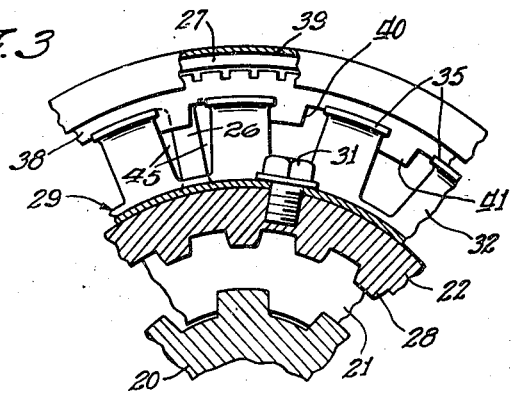
Figure 3 is a fragmentary section taken substantially on the line 3—3 of Figure 1.
Figure 4:
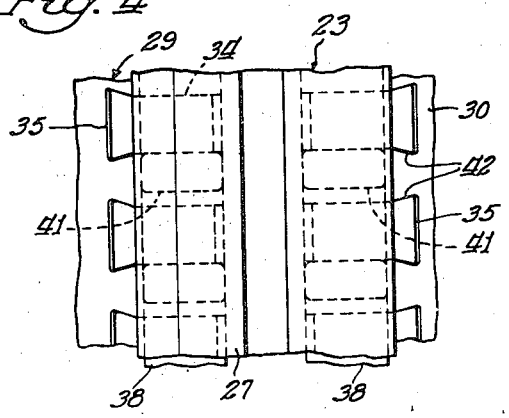
Figure 4 is a development view of the supporting springs and lugs on the synchronizer cone.

Each synchronizer cone 38 is provided internally with a plurality of circumferentially spaced, axially extending slots 40. As indicated in Figures 3 and 4, each of said slots is of a substantially greater width than the width of the corresponding portion 34 of the finger 32 which extends into and axially through the slot. The portions of the synchronizer cone between the slots 40 are in the form of lugs 41 which have substantial clearance in the spaces between the fingers 32 of the spring 29.

The outer end portions 35 of the spring fingers 32, as previously described, are outwardly bent, said bent portion being axially beyond the ends of the synchronizer cones when said cones are in the neutral position of Figure 1 when the positive clutches are not engaged. Said end portions 35, as best shown in Figure 4, have outwardly flared corners 42 formed by angular and outwardly extending edges of said end portions. Said inclined edges or corners, as shown in Figure 4, engage the corners of the lugs 41 when there is overrunning relation of the synchronizer cone with respect to the spring fingers 32. Said corners, therefore, provide a blocking action, the degree or extent of the blocking action being determined by the steepness of the inclination of said edges.

The shifter member is provided with a slot 43 in the outer sleeve portion 23 by means of which a conventional shifter fork 44 may be utilized to shift the synchronizer unit in either direction.

The operation of the synchronizer unit as above described is the same as with conventional synchronizers now in extensive use on automotive vehicles. It will be noted that in Figure 2 the bent portions 33 of the spring fingers 32 lie overlapping the spokes 26 of the shifting member. In order to provide for this shifting of the fingers, said spokes are spaced to provide slots 45. Said slots are shown in an end view in Figure 3. When synchronization is reached and before the bent portions 33 of the fingers 32 have reached the center web 26, the positive clutches are already engaged. Said springs are so designed and spaced with respect to the postive or connecting portions of the web 26 between the openings 45 that the fingers do not contact the center web so as to prevent completion of the shifting operation.

A shifting movement will be described which would change the mechanism from the neutral or non-engaged position of Figure 1 to the engaged position of Figure 2. The shifter fork 41 is moved to the left whereby the left-hand synchronizer cone 38 is engaged with the contacting face 37 frictionally engaging the contacting face 36 on the shifter member. As soon as this frictional engagement takes place, assuming that the shaft 10 and the shifting member which is carried thereby are rotating at a different speed than the gear 14, the synchronizer cone 38 at the left-hand side is rotated to abut the spring fingers 32 at one set of edges of the portions 34 or the other set, depending upon whether the gear 14 is moved faster or slower than the shaft 10. A synchronizing action is then set up dependent upon the actual pressure exerted on the shifter member. The upturned end portions 35 of the spring fingers act as a detent mechanism to delay axial movement of the shifter member until a predetermined force is applied thereto. This force is determined by the strength of the spring fingers and the angle at which the end portions 35 are bent outwardly with respect to the portions 34. In Figure 2 the end portions 35 have been pushed downwardly into a position parallel to the axis of the shaft 10.

To provide a more positive delaying action and in some cases a completely positive blocking action, the corners 42, or similar projecting extensions, may be provided on the outer ends of the shifter fingers. When the shifter cone is forced in an overrunning direction with respect to the fingers 32, a blocking action will be provided dependent upon the retention provided by the corners 42. The extent and shape of these corners and the angle by which they are joined with the portions 34, which have parallel edges, determine the amount of blocking action obtained. With the provision of retaining corners 42 on the spring fingers, the shifting may be completed when synchronization, or a substantial synchronization, has been reached of the gear 14 and the shifter member 23.

One of the problems in manufacturing synchronizing units has been the accuracy required in obtaining conical friction faces which are concentric and which are not cocked with respect to each other. Any eccentricities or cocking action binds the parts and reduces the friction surface available for synchronization. In a construction as illustrated the springs 29 hold the synchronizer cones 38 resiliently in such a manner that they are self-centering and accommodate themselves to the most efficient frictional engagement of the friction faces 37 with the friction faces 36 of the shifter member. The securing members 39 act only to hold the cones in position when they are not engaged for synchronizing action.

Applicant has shown and described only one preferred embodiment of his improved synchronizing unit. It is understood that all modifications falling within the appended claims are considered as his invention.

What is claimed is:

1. A synchronizer construction comprising a shaft, a driven member mounted on said shaft for rotation with respect thereto, an annular extension on said member, splines formed on said shaft, splines formed internally on said extension, a sleevelike member splined on said shaft for axial movement thereon, said sleevelike member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said face, means on the shifter member for limiting axial movement of said synchronizer cone, said synchronizer cone being formed internally with circumferentially spaced lugs forming slots therebetween, and a supporting structure for said synchronizer cone consisting of a spring structure having a cylindrical portion rigidly secured to the sleevelike extension of the driven member, and a plurality of spring fingers extending therefrom through the slots of the synchronizer cone, a substantial portion of said spring fingers being substantially narrower than said slots, 2. A synchronizer construction comprising a shaft, a driven member mounted on said shaft for rotation with respect thereto, an annular extension on said member, splines formed on said shaft, splines formed internally on said extension, a sleevelike member splined on said shaft for axial movement thereon, said member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said face, means on the shifter member for limiting axial movement of said synchronizer cone, said synchronizer cone being formed internally with circumferentially spaced lugs forming slots therebetween, and a supporting structure for said synchronizer cone consisting of a spring structure having a cylindrical portion rigidly secured to the sleevelike extension of the driven member, and a plurality of spring fingers extending therefrom through the slots of the synchronizer cone, said spring fingers being substantially narrower than said slots and having portions provided with end portions extending beyond the synchronizer cone when in neutral position, said end portions being bent upwardly to provide a resilient delaying action during shifting of the synchronizer member and said finger ends having outwardly flared portions forming corner abutments for the lugs of the synchronizer cone to provide a blocking action against shifting until synchronization is reached.

3. A synchronizer construction comprising a shaft, a driven member mounted on said shaft for rotation with respect thereto, an annular extension on said member, splines formed on said shaft, splines formed internally on said extension, a sleevelike member splined on said shaft for axial movement thereon, said member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said face, means on the shifter member for limiting axial movement of said synchronizer cone, said synchronizer cone being formed internally with circumferentially spaced lugs forming slots therebetween, and a supporting structure for said synchronizer cone consisting of a spring structure having a cylindrical portion rigidly secured to the sleevelike extension of the driven member, and a plurality of spring fingers having portions extending therefrom centrally and radially outwardly from the cylindrical portion in a substantially axial direction and thence by means of bends in an axial direction through the slots of the synchronizer cone, said portions of the spring fingers being substantially narrower than said slots.

4. A synchronizer construction comprising a shaft, a driven member mounted on the shaft for rotation with respect thereto, an annular extension on said member, splines formed on said shaft, splines formed internally on said extension, a sleevelike member splined on said shaft for axial movement thereon, said member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said face, means on the shifter member for limiting axial movement of said synchronizer cone, said synchronizer cone being formed internally with circumferentially spaced lugs forming slots therebetween, and a supporting structure for said synchronizer cone consisting of a spring structure having a cylindrical portion rigidly secured to the sleevelike extension of the driven member, and a plurality of spring fingers having portions extending therefrom through the slots of the synchronizer cone, said portions of the spring fingers being substantially narrower than said slots and said spring fingers being provided with end portions extending beyond the synchronizer cone when in neutral position, said end portions being bent upwardly to provide a resilient delaying action during shifting of the synchronizer member.

5. A synchronizer construction comprising a shaft, a driven member mounted on the shaft for rotation with respect thereto, an annular extension on said member, splines formed on said shaft, splines formed internally on said extension, a sleevelike member splined on said shaft for axial movement thereon, said member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchonizer cone mounted for engagement with said face, means on the shifter member for limiting axial movement of said synchronizer cone, said synchronizer cone being formed internally with circumferentially spaced lugs forming slots therebetween, and a supporting structure for said synchronizer cone consisting of a spring structure having a cylindrical portion rigidly secured to the sleevelike extension of the driven member, and a plurality of spring fingers extending therefrom through the slots of the synchronizer cone, said spring fingers having portions substantially narrower than said slots and being provided with end portions extending beyond the synchronizer cone when in neutral position, said finger ends having outwardly flared portions forming corner abutments for the lugs of the synchronizer cone to provide a blocking action against shifting until synchronization is reached.

6. A synchronizer construction comprising a shift, a driven member mounted on the shaft for rotation with respect thereto, an annular extension on said member, splines formed on said shaft, splines formed internally on said extension, a sleevelike member splined on said shaft for axial movement thereon, said member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said face, means on the shifter member for limiting axial movement of said synchronizer cone, said synchronizer cone being formed internally with circumferentially spaced lugs forming slots therebetween, and a supporting structure for said synchronizer cone consisting of a spring structure having a cylindrical portion rigidly secured to the sleevelike extension of the driven member, and a plurality of spring fingers extending therefrom centrally and radially outwardly therefrom in a substantially axial direction and thence in an axial direction through the slots of the synchronizer cone, said spring fingers having portions substantially narrower than said slots and being provided with end portions extending beyond the synchronizer cone when in neutral position, said finger ends having outwardly flared portions of greater width than the narrow portions thereby forming corner abutments for the lugs of the synchronizer cone to provide a blocking action against shifting until synchronization is reached.

7. A synchronizer construction comprising a shaft, a driven member mounted on said shaft for rotation with respect thereto, an annular extension on said member, splines formed on said shaft, splines formed internally on said extension, a sleevelike member splined on said shaft for axial movement thereon, said member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said face, means on the shifter member for limiting axial movement of said synchronizer cone, said synchronizer cone being formed internally with circumferentially spaced lugs forming slots therebetween, and a supporting structure for said synchronizer cone consisting of a spring structure having a cylindrical portion rigidly secured to the sleevelike extension of the driven member, and a plurality of spring fingers having portions extending from the cylindrical portion centrally and radially outwardly therefrom in a substantially axial direction and thence by means of bends in an axial direction through the slots of the synchronizer cone, said portions of the spring fingers being substantially narrower than said slots and said spring fingers being provided with end portions extending beyond the synchronizer cone when in neutral position, said end portions being bent upwardly beyond the narrow portions to provide a resilient delaying action during shifting of the synchronizer member and said finger ends having outwardly flared portions forming corner abutments for the lugs of the synchronizer cone to provide a blocking action against shifting until synchronization is reached.

8. A synchronizer construction comprising a shift, a driven member mounted on said shaft for rotation with respect thereto, an annular extension on said member, splines formed on said shaft, splines formed internally on said extension, a sleevelike member splined on said shaft for axial movement thereon, said sleevelike member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said conical face, means on the shifter member for limiting axial movement of said synchronizer cone, said synchronizer cone being formed internally with circumferentially spaced lugs forming slots therebetween, and a resilient supporting structure for said synchronizer cone including a plurality of fingers carried by the driven member and having portions extending through the slots of the synchronizer cone, said portions being substantially narrower than said slots.

9. A synchronizer construction comprising a shaft, a driven member mounted on said shaft for rotation with respect thereto, an annular extension on said member, splines formed on said shaft, splines formed internally on said extension, a sleevelike member splined on said shaft for axial movement thereon, said sleeve-like member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said conical face, means on the shifter member for limiting axial movement of said synchronizer cone in a non-engaging direction, said synchronizer cone being formed internally with circumferentially spaced lugs forming slots therebetween, and a resilient supporting structure for said synchronizer cone including a plurality of fingers carried by the driven member and having portions extending through the slots of the synchronizer cone, said portions being substantially narrower than said slots and resiliently engaging the cone to support it in concentric position with respect to the shaft.

10. A synchronizer construction comprising a shaft, a driven member mounted on said shaft for rotation with respect thereto, an annular extension on said member, splines formed on said shaft, splines formed internally on said extension, a sleevelike member splined on said shaft for axial movement thereon, said sleeve-like member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said conical face, means on the shifter member for limiting axial movement of said synchronizer cone, said synchronizer cone being formed internally with circumferentially spaced lugs forming slots therebetween, and a resilient supporting structure for said synchronizer cone including a plurality of fingers carried by the member having the annular extension and extending through the slots of the synchronizer cone, the portions of said fingers extending through the slots being substantially narrower than said slots and said fingers being provided with end portions extending beyond the synchronizer cone when in neutral position, said finger ends having outwardly flared portions forming corner abutments for the lugs of the synchronizer cone to provide a blocking action against shifting until synchronization is reached.

11. A synchronizer construction compromising a shaft, a driven member mounted on said shaft for rotation with respect thereto, an annular extension on said member, splines formed on said shaft, splines formed internally on said extension, a sleevelike member splined on said shaft for axial movement thereon, said sleeve-like member being externally splined and engageable with the splines on said extension, a shifter member mounted on said sleevelike member for rotation therewith and for axial shifting thereof, said shifter member having an axially extending portion spaced from the sleevelike member, said portion being provided with an internally formed friction face, a synchronizer cone mounted for engagement with said conical face, means on the shifter member for limiting axial movement of said synchronizer cone, said synchronizer cone being formed internally with circumferentially spaced lugs forming slots therebetween, and a resilient supporting structure for said synchronizer cone including a plurality of fingers carried by the driven member and having portions extending through the slots of the synchronizer cone, said portions of said fingers being substantially narrower than said slots and being provided with end portions extending beyond the synchronizer cone when in neutral position, said end portions being bent upwardly to provide a resilient delaying action during shifting of the synchronizer member.

12. A synchronizer construction comprising a driven shaft, two spaced gears mounted on the driven shaft for rotation with respect thereto, annular extensions on said gears directed toward each other in the space between the gears, splines formed internally on said extensions, a sleevelike member splined on said driven shaft for axial movement thereon, said sleeve-like member being externally splined and engageable with the splines on either extension, a shifter member mounted on said sleevelike shifter member for rotation and shifting therewith, said member having axially extending portions spaced from the sleevelike member, said portions being provided with internally formed conical friction faces, a synchronizer cone mounted at each side of the shifter member for engagement with each of said conical faces, means on the shifter member with limiting axial movement of said synchronizer cones, said synchronizer cones being formed internally with circumferentially spaced lugs forming slots therebetween, and a supporting structure for each of said synchronizer cones consisting of a spring structure having a portion secured to the extension on the corresponding gear, and a plurality of fingers extending therefrom through the slots of the synchronizer cone.

13. A synchronizer construction comprising a driven shaft, two spaced gears mounted on the driven shaft for rotation with respect thereto, a synchronizer unit mounted on said driven shaft between said gears, said synchronizer construction comprising annular extensions on said gears directed toward each other in the space between the gears, splines formed on said driven shaft between said gears, splines formed internally on said extensions, a sleevelike member splined on said shaft for axial movement thereon, said sleeve-like member being externally splined and engageable with the splines on either extension, a shifter member mounted on said sleevelike member for rotation and shifting therewith, said shifter member having axially extending portions spaced from the sleevelike member, said portions being provided with internally formed conical friction faces, a synchronizer cone mounted at each side of the shifter member for engagement with each of said conical faces, means on the shifter member for limiting axial movement of said synchronizer cones, said synchronizer cones being formed internally with circumferentially spaced lugs forming slots therebetween, and a supporting structure for each of said synchronizer cones consisting of a spring structure having a cylindrical portion rigidly secured to the extension on the corresponding gear, and a plurality of reversedly bent fingers extending therefrom through the slots of the synchronizer cones, said spring fingers being provided with end portions extending beyond the synchronizer cone when in neutral position, said end portions being bent upwardly to provide a resilient delaying action during shifting of the synchronizer member.

14. A synchronizer construction comprising a driven shaft, two spaced gears mounted on the driven shaft for rotation with respect thereto, a synchronizer unit mounted on said driven shaft between said gears, said synchronizer construction comprising annular extensions on said gear directed toward each other in the space between the gears, splines formed on said driven shaft between said gears, splines formed internally on said extensions, a sleevelike member splined on said shaft for axial movement thereon, said sleeve-like member being externally splined and engageable with the splines on either extension, a shifter member mounted on said sleevelike member for rotation and shifting therewith, said shifter member having axially extending portions spaced from the sleevelike member, said portions being provided with internally formed conical friction faces, a synchronizer cone mounted at each side of the shifter member for engagement with each of said conical faces, means on the shifter member for limiting axial movement of said synchronizer cones, said synchronizer cones being formed internally with circumferentially spaced lugs forming slots therebetween, and a supporting structure for each of said synchronizer cones consisting of a spring structure having a cylindrical portion rigidly secured to the extension on the corresponding gear, and a plurality of reversedly bent fingers having portions extending therefrom through the slots of the synchronizer cones, said portion of the spring fingers being substantially narrower than said slots and said fingers being provided with end portions extending beyond the synchronizer cone when in neutral position, said finger ends having outwardly flared portions forming corner abutments for the lugs of the synchronizer cone to provide a block action against shifting until synchronization is reached.

FRANK W. AVILA.

REFERENCES CITED

The following references are of record in the file of this patent:

UNITED STATES PATENTS

| Number | Name | Date |
| --- | --- | --- |
| 2,245,816 | Peterson | June 17, 1941 |
| 2,271,571 | Peterson | Feb. 3, 1942 |
| 2,360,976 | Peterson et al. | Oct. 24, 1944 |

Certificate of Correction

Patent No. 2,470,208                                  May 17, 1949

FRANK W. AVILA

It is hereby certified that errors appear in the printed specification of the above numbered patent requiring correction as follows:

Column 5, line 26, for the word "being" read *having portions*; line 27, for "having portions" read *being*; column 6, line 60, and column 7, line 62, for "shift" read *shaft*; column 9, line 39, strike out "shifter" and insert the same after "said" and before "member" in line 40;

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*